United States Patent Office 3,839,474
Patented Oct. 1, 1974

3,839,474
TELOMERS FROM DICHLOROBUTENES AND VINYL CHLORIDE
Charles M. Starks, Ponca City, Okla., assignor to Continental Oil Company, Ponca City, Okla.
No Drawing. Filed July 17, 1972, Ser. No. 272,602
Int. Cl. C07c 21/04
U.S. Cl. 260—654 R       6 Claims

ABSTRACT OF THE DISCLOSURE

Dichlorobutenes such as 3,4-dichloro-1-butene and 1,4-dichloro-2-butene react with vinyl chloride to form telomers which are polyhalogenated alkenes.

BACKGROUND OF THE INVENTION

This invention relates to a process for producing telomers which are polyhalogenated alkenes.

U.S. 3,406,210 discloses that a polyhaloolefin such as 1,2-dichloro-1-butene and 2,3-dichloro-2-butene can be reacted with an alkene such as propene in the presence of a free radical promoter to form polymers. This patent is distinguished from the instant invention in that an olefin rather than a chlorinated olefin such as vinyl chloride is employed as the second reactant.

U.S. 2,893,983 discloses that dichlorohexafluorobutene is copolymerized with a monochloroethylene such as vinyl chloride at temperatures between $-20°$ C. $150°$ C. to form copolymers which are useful as coatings and molding materials. The dichlorobutenes of the instant invention are distinguished from hexafluorobutene. The polymers produced according to the patent also appear to be relatively high molecular weight polymers rather than telomers.

U.S. 2,438,021 discloses that an aliphatic halogen containing organic compound such as vinyl chloride is reacted with ethylene at a temperature of $50°$ C. to $100°$ C. in the presence of a peroxide catalyst. A telomerization is disclosed to take place. However, both the telogen and taxogen are different than in the instant invention.

U.S. 2,893,382; U.S. 2,770,659; and U.S. 2,766,299 were also found in the pre-filing search, but are not believed to be more relevant than the patents specifically treated above.

OBJECTS OF THE INVENTION

An object of the invention is to provide a process for producing telomers by contacting vinyl chloride with a dichlorobutene wherein no carbon atom of the dichlorobutene has more than one chlorine atom bonded thereto and wherein no carbon atom doubly bonded to another carbon atom has a chlorine atom bonded thereto.

SUMMARY OF THE INVENTION

In one aspect, this invention discloses a process for the production of telomers by contacting vinyl chloride and 3,4-dichloro-1-butene or 1,4-dichloro-2-butene.

DESCRIPTION OF THE PREFERRED EMBODIMENTS

The instant invention relates to production of telomers by the telomerization of vinyl chloride and 3,4-dichloro-1-butene or 1,4-dichloro-2-butene. The process is expeditiously represented as follows in its embodiments wherein 3,4-dichloro-1-butene and wherein 1,4-dichloro-2-butene are employed.

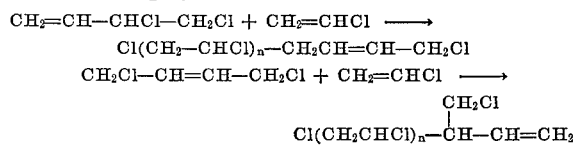

wherein $n$ is an integer of from 1 to about 20. According to a presently preferred mode of operation, $n$ is an integer of from 1 to 10.

The telomers of the invention are produced by contacting vinyl chloride with 3,4-dichloro-1-butene or 1,4-dichloro-2-butene in a reaction environment having a catalytic amount of a free radical initiator present therein.

To produce the telomers of the invention about 0.01 to 100 moles of vinyl chloride are employed for each mole of dichlorobutene employed. Amounts of vinyl chloride outside of this range are not satisfactory to produce telomers having the beneficial properties of the telomers produced according to the invention. It is presently preferred to employ 0.05 to 10 moles of vinyl chloride for each mole of dichlorobutene.

The telomerization conversion of the invention can be conducted at temperatures in the range of $-10°$ to $250°$ C. At temperatures below about $-10°$ C., insufficient rate of reaction occurs to be practical. At temperatures above about $250°$ C., deleterious side reactions become a problem. Presently, it is preferred to employ temperatures in the range of $50°$ to $100°$ C. for optimum results when a chemical free radical initiator is employed. When the telomerization is initiated thermally, a temperature of $150°$ to $250°$ C. is preferably employed.

Pressure is not critical according to this invention. In general, any pressure sufficient to maintain the vinyl chloride and the dichlorobutene in a fluid reaction environment can be employed. Pressures in the range of 0 to 2000 p.s.i.g. are suitable. Presently, it is preferred to employ pressures in the range of 0 to 200 p.s.i.g. for optimum results. It is often convenient to operate at atmospheric pressure.

A sufficient reaction time is employed to carry out the degree of conversion desired. Reaction time is determined by the rate of initiation provided by initiator, and optimum reaction time can be determined by simple experiment for each particular system. Reaction times from about 2 minutes to 10 days are exemplarily employed.

If desired, diluents can be employed in the reaction environment. Examples of some suitable diluents include hydrocarbons such as benzene, toleune, xylene, and the like. Halogenated hydrocarbons such as 1,2-dichlorotetrafluoroethane, chlorotrifluoromethane, dichlorodifluoromethane, chlorobenzene, and the like can be employed if desired. If a diluent is employed, it can comprise as much as 95 weight percent of the fluid materials present in the reaction environment.

Free radical initiating means are employed. Thus, a chemical free radical forming initiator can be employed to promote the telomerization if desired. Any chemical free radical forming initiator known to the prior art to form free radicals can be employed. Some suitable chemical free radical initiators include organic peroxides such as benzoyl peroxide, acetyl peroxide, t-butyl peroxide, t-butyl peracetate, ethyl peroxide, t-butyl perbenzoate, succinic peroxide, diisopropyl percarbonate, and the like; as well as azobisisobutrylnitrile, other azo compounds, triphenylchloromethane, copper oxides, iron oxides, chromium, tetraethyl lead, and the like. The reaction can also be thermally initiated if desired. Other free radical initiating means such as gamma radiation can also be employed.

When a chemical free radical initiating means is employed, about 0.0001 to 0.10 moles of the chemical free radical forming initiator per mole of vinyl chloride plus the dichlorobutene is often suitable.

The cotelomers produced according to this invention can be separated from each other, from diluent, and from other materials present by any means known to the art for separation of organic chemicals. For example, fractional distillation, fractional crystallization, selective solvents, chromatography, and the like can be employed.

The following examples are presented so that the invention may be more readily understood. The examples should not be interpreted to limit the invention in any manner.

Example 1

Materials as presented in Table I, below, were charged to a stirred reactor. The reaction mixture was heated at 70° C. at atmospheric pressure for 24 hours. After cooling and venting, volatile material was removed first in a rotary evaporator and then in a vacuum distillation apparatus at 100° C. and 0.1 torr pressure. Telomer products having generic formulas as shown heretofore in this application were obtained in each run.

TABLE I

| Run No. | Charged to reactor | | | | | Telomer product | |
|---|---|---|---|---|---|---|---|
| | $C_6H_6$ (ml.) | $B_2O_2$ (g.)[1] | Telogen kind[2] | Weight (g.) | Vinyl chloride (g.) | Weight (g.) | Average mole weight |
| 1 | 50 | 0.2 | 3,4 | 41.4 | 42.0 | 34.0 | 439 |
| 2 | 50 | 0.2 | 3,4 | 32.7 | 30.3 | 31.3 | 476 |
| 3 | 50 | 0.2 | 3,4 | 8.9 | 37.8 | ([3]) | 787 |
| 4 | 50 | 0.2 | 1,4 | 46.2 | 38.7 | ([3]) | 800 |
| 5 | 50 | 0.2 | 1,4 | 30.8 | 43.1 | 35.4 | 1,505 |
| 6 | 50 | 0.2 | 1,4 | 17.3 | 33.5 | 31.6 | 2,380 |

[1] $B_2O_2$ is benzoyl peroxide.
[2] "3,4" represents 3,4-dichloro-1-butene, and "1,4" represents 1,4-dichloro-2-butene.
[3] Not determined.

This example demonstrates the production of telomers from vinyl chloride and a dichlorobutene wherein no carbon atom of the dichlorobutene has more than one chlorine bonded thereto and wherein no carbon atom doubly bonded to another carbon atom of the dichlorobutene has a chlorine bonded thereto.

Example 2

The telomers produced according to the process of this invention are useful materials. Thus, the telomers produced in Example 1 were impregnated into wood and onto cloth to give tough water- and oil-proof materials. Paper impregnated with these telomers is composited under heat and pressure to produce a hard resistant product suitable for covering furniture and the like.

I claim:

1. A process for producing telomers comprising (a) contacting, in a liquid phase and in the presence of a catalytic amount of a free radical initiator, vinyl chloride with a dichlorobutene wherein no carbon atom of the dichlorobutene has more than one chlorine atom bonded thereto, and wherein no carbon atom of the dichlorobutene which is doubly bonded to another carbon atom of the dichlorobutene has a chlorine atom bonded thereto, and (b) recovering from the admixture of step (a) the desired telomers, said process being characterized further in that
   (i) a temperature of −10° C. to 250° C. is employed,
   (ii) from 0.01 to 100 moles of vinyl chloride are employed for each mole of dichlorobutene, and
   (iii) from 0.0001 to 0.10 mole of a chemical free radical initiator is employed for each mole of dichlorobutene plus vinyl chloride present in the reaction environment.

2. The process of Claim 1 wherein a temperature of 50° C. to 100° C. is employed.

3. The process of Claim 2 wherein the chemical free radical initiator employed is benzoyl peroxide.

4. The process of Claim 3 wherein 1 to 95 weight percent of the fluid materials of the reaction environment is benzene diluent.

5. The process of Claim 4 wherein the dichlorobutene is 3,4-dichloro-1-butene.

6. The process of Claim 4 wherein the dichlorobutene is 1,4-dichloro-2-butene.

References Cited

UNITED STATES PATENTS

| 3,406,210 | 10/1968 | Schmerling | 260—658 C |
| 2,893,983 | 7/1959 | Lo | 260—87.5 |
| 2,440,800 | 5/1948 | Hanford et al. | 260—653.1 T |
| 3,290,397 | 12/1966 | Rust et al. | 260—654 R |

BERNARD HELFIN, Primary Examiner

J. A. BOSKA, Assistant Examiner

U.S. Cl. X.R.

252—8.6; 117—148, 155